Figure 1:
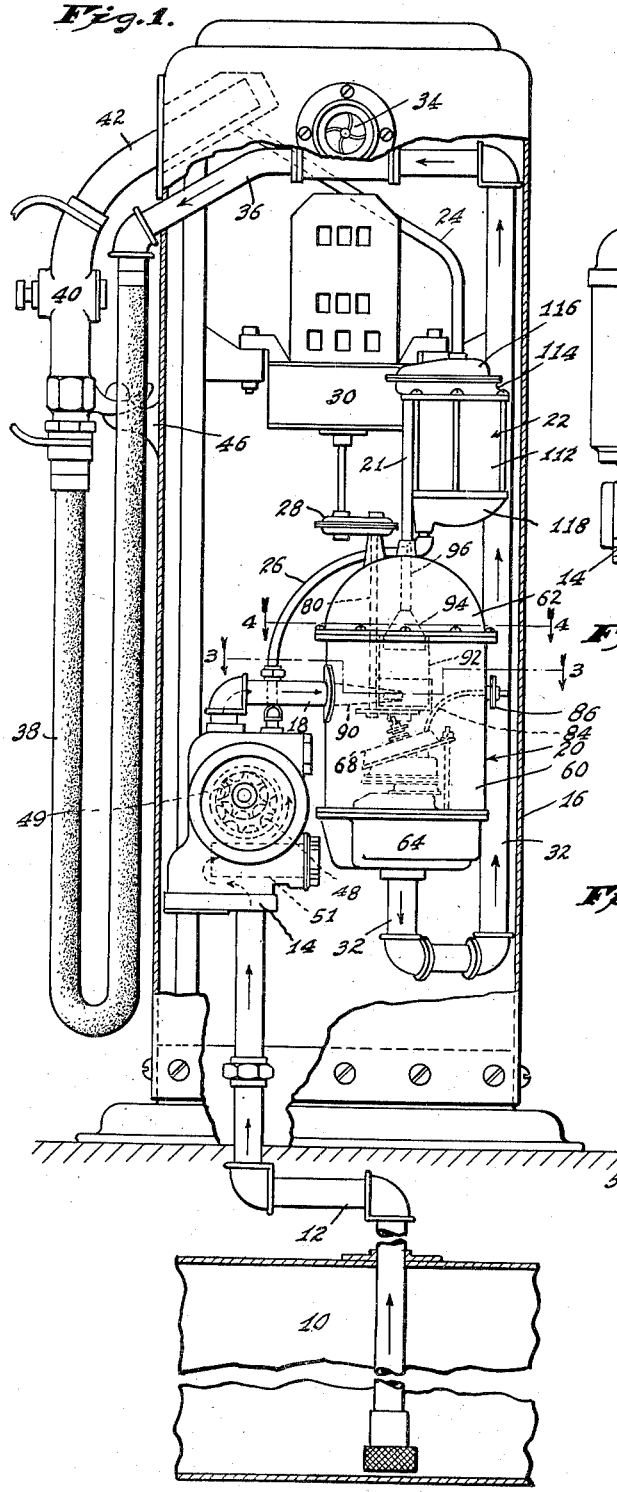

Jan. 29, 1957   G. W. WRIGHT ET AL   2,779,503
AIR SEPARATOR
Filed June 3, 1950   2 Sheets-Sheet 1

INVENTORS
GEORGE W. WRIGHT,
ROBERT J. JAUCH and
BY  JOSEPH D. CLYMER,

Schley, Zash & Jenkins
ATTORNEYS;

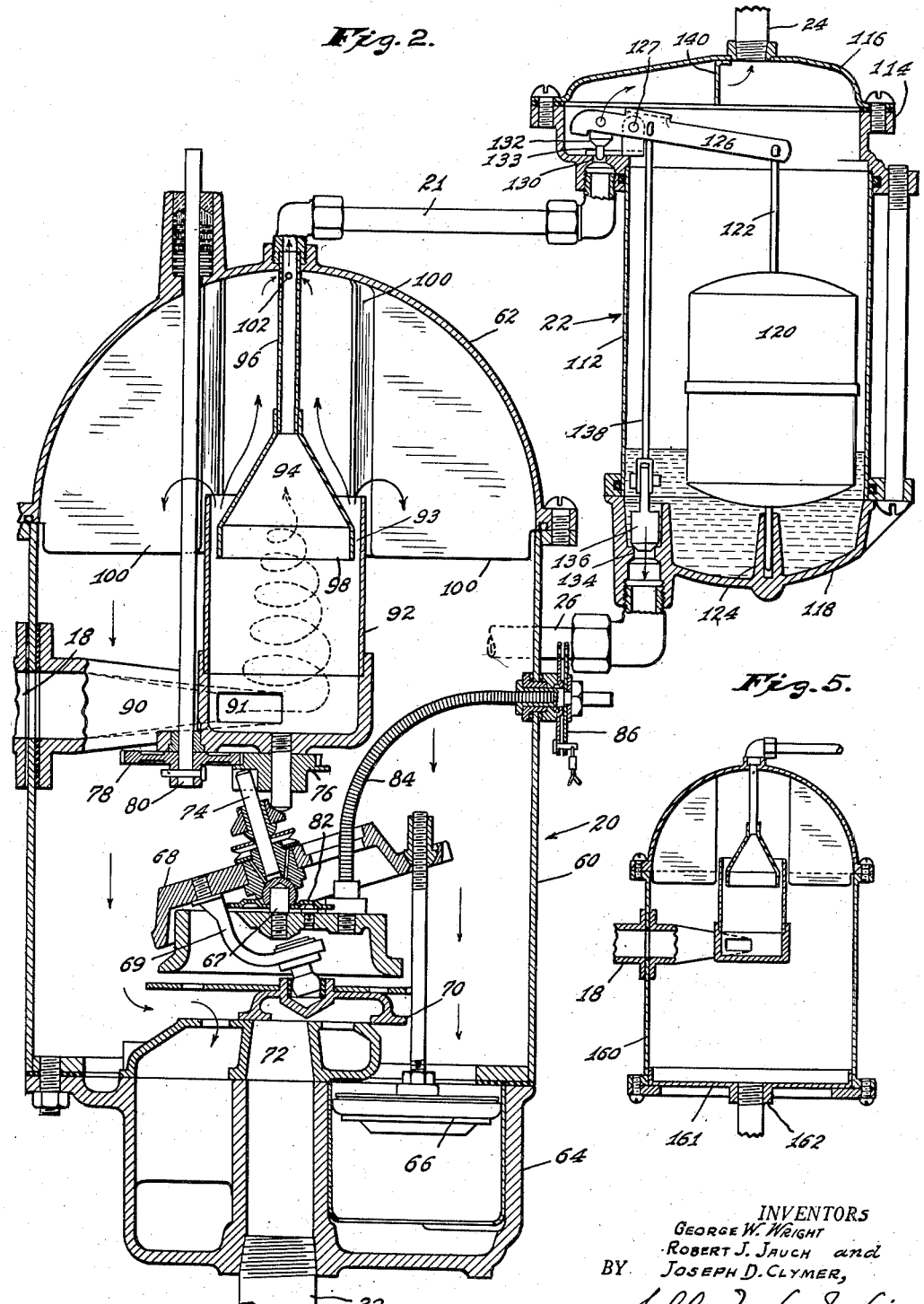

United States Patent Office 2,779,503
Patented Jan. 29, 1957

2,779,503
AIR SEPARATOR

George W. Wright, Robert J. Jauch, and Joseph D. Clymer, Fort Wayne, Ind., assignors to Tokheim Corporation, a corporation of Indiana Application June 3, 1950, Serial No. 166,038

23 Claims. (Cl. 222—72)

This invention relates to a separator for separating gases from liquids, especially for separating air and vapor from gasoline in gasoline dispensing apparatus; and to dispensing apparatus embodying such separator.

Heretofore it has not been possible in practical gasoline dispensing equipment to eliminate all the air which could occur in the gasoline stream. Available air-separation means has been such that in applying governmental regulations to commercial gasoline dispensing equipment, it has been necessary and accepted practice to limit arbitrarily the amount of air required to be eliminated in order for such equipment to be considered passable, and an arbitrary standard commonly used requires that the dispensing equipment eliminate only the amount of air which will enter the gasoline stream through a fixed $1/16''$ orifice in the suction line to the equipment.

In the usual gasoline dispensing installation, the gasoline is drawn from an underground storage tank through piping installed under the control of the service station owner to a dispensing stand provided as a unit by its manufacturer. In the dispensing stand, a motor driven pump pumps the gasoline through an air separator, a gasoline meter connected to a computer and register, a visible gauge in which the flow of gasoline can be observed, and thence through a flexible hose and a dispensing nozzle at the delivery end of that hose, where the gasoline flow is controlled by manual operation of a valve in the nozzle. Since the manufacturer may be blamed for failure in the ultimate gasoline delivery, even through such failure arises from the fault of the underground storage tank and its connecting piping or from bad management by the operator, over which such manufacturer normally has no control, it is desirable for the manufacturer that his equipment be capable of eliminating all of the air which can possibly be admitted to that dispensing stand pump. With air elimination means heretofore available, this has not been accomplished.

The problem of effectively eliminating air (by which we mean to include air, gasoline vapors, and mixtures thereof) is complicated by many factors, including the following:

1. The extremely limited space available in the dispensing stand for housing its necesary equipment.
2. The rigid requirements for accuracy of metering and delivery of liquid, which require accuracy within a small fraction of one percent.
3. The completeness with which air must be eliminated, both as a positive requirement under governmental regulations and to avoid inaccuracy of metering.
4. The fact that gasoline is drawn from the tank and through its connecting piping by suction, and that the effective suction head varies greatly with different installations, with differences of operating conditions, with climatic conditions, and with the volatility of gasoline being handled.
5. The effect of the gasoline pump in emulsifying into the gasoline any air which enters the pump, to greatly increase the difficulty of air separation.
6. The wide and infinite variation in rates of delivery flow, and the frequent and abrupt changes in flow rates.
7. The fact that the air separation is to be accomplished on the pressure side of the pump, where pressures vary irregularly and often change abruptly as the control valve at the delivery nozzle is operated, especially in view of the effects of pressure on the solubility of air in gasoline.
8. The effect of high and varying delivery rates on the effective suction head and on the proportion of air admitted through any leaks in the suction line.
9. The high velocities of flow which are required because other limitations restrict the size of the flow passages, which tend to entrain in the liquid any air which is present.
10. The fact that air may enter the dispensing line either constantly, as through small leaks, or in slugs, as when the gasoline level in the storage tank is low.

It is a primary object of this invention to provide a more effective air separation than has heretofore been available, and to provide air separation mechanism which will eliminate all or substantially all of the air which can possibly pass through its associated pump, under all of the varying conditions which occur. It is an object of this invention to provide such an air separator which will meet all of the many applicable requirements, especially the critical space requirements, and which will overcome the effect of the many complicating factors such as those enumerated above. It is an object of the invention is provide such an air separtor which will be effective at high rates of delivery, and to make possible even higher delivery rates than have heretofore been feasible. It is an object of the invention to provide such an air separator, and a dispensing stand embodying it, which will satisfy all applicable requirements, including the complete elimination of all air that can possibly be admitted, regardless of installation conditions and regardless of the particular conditions under which the operator operates the installation, and especially to accomplish these objects in a manner which will permit the dispensing stand manufacturer to meet the air elimination requirements independently of conditions over which he has no control. Further objects and advantages of the invention will appear from the following description.

In dispensing apparatus embodying our invention, the air-separating mechanism will normally be installed in a flow line or dispensing line which is under pressure. Typically, such line will lead from a pump, which is supplied with gasoline through a suction line from an underground storage tank, and which delivers to and maintains pressure in the dispensing line. Such dispensing line will normally include the air separator, a meter (if a meter is used), a delivery hose, and a nozzle, and flow therethrough will normally be controlled by a manually operable valve in the nozzle.

With our air-separator, the pump used may be of substantially greater capacity than pumps heretofore used, and the delivery rate may be substantially higher than those previously used; and we desirably use the direct driven pump shown in the co-pending application Serial No. 177,075, filed August 1, 1950, now Patent No. 2,671,409, dated March 9, 1954, of George W. Wright, one of the joint inventors in this application.

In a preferred form of our air separator, the gasoline stream is subjected to successive stages of air-separation, involving both dynamic and static air-separation effects, in a combination which insures complete air separation under all operating conditions.

First stage separation is desirably dynamic, for example centrifugal, and for this the gasoline stream under pressure from the pump may be discharged tangentially into the bottom of a relatively small centrifuge cylinder where, especially at high flow rates, it is subjected to a centrifugal air separation, which tends to coalesce small bubbles of air and largely to concentrate the air at the core of the swirling liquid. Both the air and the liquid gasoline move upward in this centrifuge in a common direction of flow; and the main stream of liquid is discharged upward in a swirling stream through a restricted annular opening at the periphery of the centrifuge cylinder to second-stage separation apparatus, while a core stream containing separated air is collected and discharged through a separate passage.

Second-stage separation provides conditions conducive to static air-separation effects, i. e., the tendency of air to rise and separate from liquid by gravity, and desirably also utilizes dynamic air-separation effects. The second-stage separation chamber is of substantially larger volume and area than the centrifuge and is desirably formed about such centrifuge. Movement of liquid in the second-stage chamber is generally downward and relatively slow. Desirably, the swirl of the discharge stream from the centrifuge is continued at first in the second-stage chamber, to continue a centrifugal separation effect, and the kinetic energy thereof may be utilized to aid the change in general direction of liquid movement, from upward in the centrifuge to downward in the second-stage chamber. Means are provided to positively arrest the swirl as the liquid enters the main body of the second-stage chamber, and desirably to produce pressure gradient conditions acting in the same direction as static effects, to enhance the overall air-separation results. In the second-stage separation, air moves upward, oppositely from the generally downward movement of liquid, and the discharge core stream from the first stage is desirably used to withdraw air from the second-stage chamber.

Preferably, when a meter is used, we combine the air separator and the meter in a common housing so that the second stage separation chamber and the meter chamber are common to both. This is found to contribute to the overall efficiency of the air separation action, and it facilitates manufacture and saves space. It provides a larger volume body of liquid where static separation can take place, and it avoids air-pockets and insures free air-separation from the meter.

Air-discharge streams are continuously withdrawn during both stages of separation, and as noted above the first stage discharge stream may be utilized to induce flow from the second stage separation. In any event, the air-discharge flow from both stages is desirably combined into one stream. Liquid contained in such air-discharge stream is recovered, as in an air eliminator. Preferably, the discharge stream is controlled in proportion to the amount of air to be discharged, as by discharging the stream to the air-eliminator through a normally restricted valve which is opened wider as increased amounts of air occur.

Figure 3:
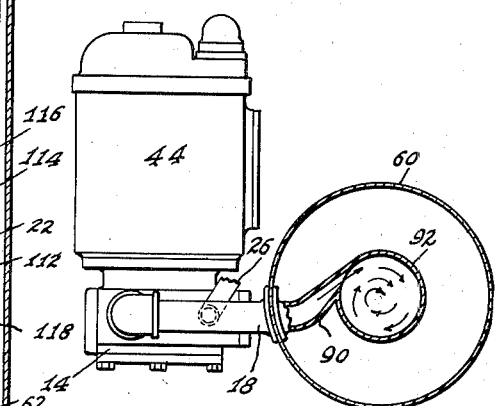
Figure 4:
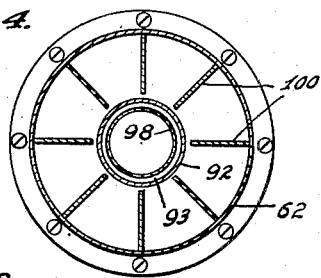

The accompanying drawings illustrate our invention. In such drawings, Fig. 1 is a vertical section through a dispensing stand embodying our invention, and showing its contained apparatus and an underground storage tank and pipe connections therefrom to the stand; Fig. 2 is a vertical section through a combined air separator, meter, and air eliminator, embodying our invention; Fig. 3 is a horizontal section of the air separator shown in Figs. 1 and 2, taken on the line 3—3 of Fig. 1; Fig. 4 is a horizontal section of such air-separator, taken on the line 4—4 of Fig. 1; Fig. 5 is a vertical section similar to Fig. 2 and showing an air separator separate from the meter; and Fig. 6 in a vertical section of the pump we prefer to use with the air separator.

In the dispensing apparatus shown in Fig. 1, a buried storage tank 10 is connected by suction piping 12 to the pump 14 of the dispensing stand 16. The pump discharges through a pipe 18 to a combined air separator and meter 20 from which an air-discharge stream is led by a pipe 21 to an air eliminator 22, vented to atmosphere through a vent pipe 24. Liquid gasoline carried over into the air eliminator 22 is returned to the suction side of the pump through a pipe 26. The meter mechanism of the combined air separator and meter 20 is connected through a gear case 28 to the drive shaft of a computer and register 30, which may be of conventional construction. The main stream of gasoline from the air separator and meter 20 is discharged through a pipe 32 leading from the bottom of the meter upwardly to a visible gauge 34 located at the top of the dispensing stand 16. From this gauge 34 the gasoline passes through a pipe 36 to the delivery hose 38, through which it is dispensed under control of the control valve 40 of the nozzle 42. The pump is driven by an electric motor 44 controlled by a suitable switch actuated in the usual way upon removal of the nozzle 42 from its supporting bracket 46.

The dispensing stand 16 and the mechanism it contains as shown in Fig. 1 is ordinarily assembled as a unit by the manufacturer, and is installed as a unit at the service station, where its pump 14 is connected to the piping 12 and tank 10 installed by the service station owner in readiness for the dispensing stand assembly.

Figure 6:
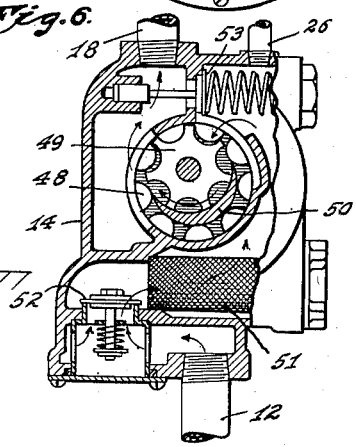

The pump 14 is of the positive-displacement gear type, and is desirably a direct-connected motor-driven pump as in the aforesaid co-pending application of George W. Wright. As is best indicated in Fig. 6, the pump 14 comprises a motor-driven crown- or ring-gear 48 meshing internally with an idler pinion 49. The pinion 49 is of smaller diameter and has fewer teeth than the ring gear 48, and the space between the two gears, opposite their meshing point, is filled by a crescent-shaped block 50. Intake to the pump from the suction line 12 is desirably through a check-valve 52 and filter screen 51. In operation, the gears 48 and 49 as shown in Figs. 1 and 6 rotate clockwise, to draw the gasoline through the check valve 52 and filter screen 51 to an intake port in the upper right quadrant of the gear case, and to discharge the gasoline from a discharge port in the upper left quadrant of the case, to the pipe 18 leading to the air separator. A pressure-responsive by-pass valve 53 in the upper body of the pump by-passes gasoline from the discharge to the suction side of the pump when dispensing flow is restricted or cut-off at the delivery nozzle 42. It is characteristic of this type pump that in it air present in the gasoline stream tends to be emulsified into the gasoline in quite small particles, often of colloidal size.

The air separator and meter 20 comprises a cylindrical casing 60 closed at the top by a dome 62, desirably of semi-spherical shape, and closed at the bottom by a meter body 64. The meter mechanism comprises a plurality of pistons 66, usually three, connected by piston rods to a nutating plate 68 mounted on a swivel support 67 and operated by the pistons. The nutating plate 68 carries a depending arm 69, which operates a slide valve 70 at the discharge port 72 of the meter, and carries an upstanding pin 74 operatively engaged in a slot in an idler gear 76 to drive such gear 76. Such gear 76 meshes with and drives a gear 78 fixed on a drive shaft 80 extending upward through the dome 62 and connected to drive the computer 30. The meter mechanism is of the type shown in the Bechtold Patent No. 2,021,882, to which reference is made for further disclosure and explanation. For calibrating the meter, the swivel support 67 for the nutating plate 68 is adjusted vertically in the usual manner by a rotatable cam plate 82, and such adjustment is effected through a flexible cable 84 leading to adjusting and locking mechanism 86 outside the case 60.

The air separation structure is combined in the same chamber with the meter mechanism. A gasoline inlet duct 90 is supported by the case wall 60 in communication with the delivery pipe 18 from the pump, at a point about midway of the height of the combined air separator and meter 20. Such inlet duct 90 leads to and supports a central cup 92, and is arranged to discharge tangentially through a port 91 in the side wall of the cup near its bottom. The duct 90 is of progressively decreasing cross sectional area, and its discharge port 91 is of restricted area, to increase the velocity of the tangential stream entering the cup 92. The interior of the cup 92 is open and unobstructed, and its cylindrical walls rise vertically to a point above the bottom of the semi-spherical dome 62. A cone-shaped core-stream collector 94, supported by a pipe 96, depends into the upper open end of the cup 92. Such collector 94 terminates at the bottom in a short cylindrical skirt 98 parallel with and spaced inward from the cylindrical wall of the cup 92 to form a restricted annular outlet 93 from the cup 92, such outlet being of substantially uniform cross-section over the full height of the skirt 98. In one successful embodiment of our invention, the tangential inlet port 91 from the duct 90 had an area of about ½ square inch, the cup 92 was about 2⅜ inches in diameter, the annular outlet 93 had an area of about 1¼ square inch, and the area between the cup 92 and the casing wall 60 was about 50 square inches.

A circumferential series of generally radial baffle plates 100, conveniently supported from the dome 62, extend downward from that dome 62 to a point below the upper end of the cup 92, and their inner vertical edges lie adjacent the cylindrical wall of the cup 92 and about the upwardly projected area of the cup 92.

The cup 92 forms a first-stage centrifugal air separator, in which the gasoline is caused to swirl by its high-velocity tangential discharge through the restricted port 91. The main stream of gasoline is discharged from this first stage separation through the annular outlet 93 between the collector 94 and wall of the cup 92. The collector-supporting pipe 96 forms a conduit for discharging a core stream from the centrifugal first-stage separator.

The chamber within the casing 60 and dome 62, outside the cup 92 and collector 94, forms a second-stage separation chamber. As the main stream from the centrifuge cup 92 enters and passes through such chamber, it is subjected to additional, or second-stage, air separation forces; and air separated in such second stage collects at the top of the dome 62. Preferably, such air is discharged therefrom through bleed-openings 102 at the upper end of the pipe 96, to join the outgoing core stream. The high velocity flow of the core stream through the pipe 96 past the openings 102 produces a desirable injector action to induce flow through such openings and from the top of the dome 62; and this effect may be increased by suitable configuration of the adjacent walls of the pipe 96.

The air eliminator 22, here shown as a separate structure from the air-separator, comprises a cylindrical casing 112, closed at the top by a head 114 and cover plate 116 and closed at the bottom by a bowl 118. The eliminator 22 contains a float 120 mounted on a rod 122 which is guided at the bottom in a boss 124 and is connected at the top to a lever 126 mounted on a pivot 127. An inlet pipe 21 leading from the top of the air separator 20 in communication with its core-stream discharge pipe 96, is connected to the head 114. Flow from the pipe 21 to the air eliminator 22 is through an inlet valve comprising a seat 130 and a valve plug 132 carried by the lever 126 and having a conical face and a guide-pin 133 depending into the valve-opening. A drain-valve seat 134 is formed in the bottom bowl 118 of the eliminator 22 and flow therethrough is controlled by a valve plug 136 connected by a rod 138 to the lever arm 126 on the opposite side of its pivot 127 from the valve 132. The drain valve 134—136 drains through a drain pipe 26 connected to the intake side of the pump, conveniently at the top of its intake passageway and above the check valve 52. The vent pipe 24 for venting to the atmosphere air separated from the gasoline is connected to the top of the air eliminator 22, through the cover plate 116. Desirably, a baffle 140 protects the vent-pipe opening from any stream from the inlet valve 130—132.

As the float 120 is raised by accumulation of liquid in the air eliminator, it moves the inlet or restriction valve 132 toward closed position and moves the drain valve 136 toward open position. The two valves and their operating lever-arms are coordinated, and movement of the valve 132 is proportionately greater than that of the drain valve. Coordination of the valves is such that when the discharge stream from the air separator is substantially all liquid and contains little or no air, the air-eliminator valves will produce a balanced inlet and drain condition in which the float will be maintained in raised position, substantially closing the inlet valve, to throttle to a small amount the quantity of gasoline allowed to escape from the air separator through the inlet valve 130—132 and by-passed through the air eliminator to the suction side of the pump. As increased amounts of air occur in the discharge stream from the air-separator, the relative amount of liquid in the discharge stream will accordingly decrease, and cause the float to drop. The inlet valve 130—132 will therefore open wide to increase the volume of discharge from the air separator. Because the valve thus opens as the quantity of air increases, large quantities of air will be discharged when and if they occur, yet the amount of liquid by-passed through the air eliminator may be held at a minimum.

In operation of the dispensing installation, the pump motor 44 is started by lifting the nozzle 42 from its bracket 46 and closing the motor switch. The pump then operates continuously throughout the delivery period, and until the nozzle is returned to its bracket 46 and the motor switch opened. During such period, the conditions of gasoline flow in the dispensing stand mechanism will vary widely. At first, the nozzle valve 40 will be closed so that there will be no delivery flow, but the pump will build up and maintain in the dispensing line a pressure predetermined by the setting of the by-pass valve 53, and the main flow will be through that by-pass valve. Under such conditions, however, there will be a small circulation through the air separator 20 and air-eliminator 22, for air-discharge flow will occur from the air separator 20 to the air eliminator through the pipe 21, in a quantity controlled by the restriction valve 132. Any air accumulated in the pump 14 or air-separator 20 will be discharged from the air-eliminator 22 and vented, while the small amount of gasoline in such air-discharge stream will be returned through the drain valve 134 to the pump. With small and slow flow through the air separator, any air present will be effectively separated by static forces.

When the nozzle valve 40 is fully opened for full gasoline delivery, gasoline will be drawn by the pump 14 from the tank 10 and will be discharged, with any included air, to the inlet duct 90 of the air separator 20 under full pump volume. From such restricted duct 90 it will be discharged at high velocity tangentially in the bottom of the centrifuge cup 92, and will swirl at high velocity circumferentially and upward in that cup 92. Centrifugal air separation will occur in that centrifuge cup, which will tend to release dissolved air and to collect air at the core of the swirling liquid in the centrifuge. A drop in static pressure as the liquid emerges from the port 91 will tend to aid release of dissolved air. A core stream containing air collected by the collector 94 will be discharged through the pipe 96 and the pipe 21 to the air eliminator 22.

At high flow rates and with a fairly constant or low proportion of air most if not all of the air will be separated from the liquid by centrifugal action in this first-stage of air separation.

The swirling body of fluid in the cup 92 will be divided by the skirt 98 of the collector 94, to separate the outer layer thereof as a main stream, and this will leave the centrifuge cup 92 through the annular outlet 93, and will be traveling upward with a high-velocity swirl. As such main stream leaves that annular outlet 93 of uniform cross section, it passes first to the inwardly widening passageway between the wall of the cup and the conical wall of the collector 94, where centrifugal separation forces will continue, tending to coalesce any remaining air and throw it toward the center and upward along the conical wall of the collector 94. At the upper end of the cup wall 92, the main stream emerges to the large volume space within the dome 62, where centrifugal force will tend to throw it outward, away from the low-pressure area adjacent the bleed-openings 102. As it moves outward, its swirl is arrested by the baffles 100, which deflect it outward toward the surrounding wall of the dome 62. Meanwhile, the area of the stream progressively increases, and the stream becomes a large volume stream moving slower and quieter and in a downward direction through the large volume chamber to the meter.

Throughout the movement of the liquid from the time it leaves the centrifuge 92 to the time it enters the meter, further air separation forces are in action at varying areas and in varying intensities depending on flow rates and on the quantity and form of air present with the liquid. These forces will not only include static air-separation forces, but others as well, all cooperating to dispel air to the top and center of the dome 62.

At low delivery flow rates, the velocity of the stream entering the cup 92 through the port 91 will be correspondingly low, the intensity of swirl of the liquid in the centrifuge cup 92 will accordingly be lowered so that less or no centrifugal separation of air will occur in the cup 92. In such case, part of the air may be separated, nevertheless, in the cup 92 and collector 94, by a combination of any remaining centrifugal effect and of static separation effects and of the pressure differential and the continuous bleed-off through the core stream pipe 96. With low flow rates, however, much air may escape from the cup through the annular outlet 93 into the large volume chamber within the dome 62 and the casing 60. Because of such low flow-rates, however, the downward movement of liquid in such large-volume chamber will be at low velocity and especially quiet, to make for effective static air separation in that large-volume chamber, and the air will rise to the top of the dome 62 and will be discharged through the openings 102 to join the stream through the pipe 96 and be led to the air eliminator 22.

Low velocity of flow through the second-stage air separator chamber may result not only from low delivery rates from the nozzle 42, but also from the admission of large volumes of air to the pump, for with large volumes of air, its compressibility makes the pump less efficient, and liquid will form but part of the delivery stream from the pump. With a large proportion of air in the stream, most of it will form large bubbles which readily separate and rise to the top of the air separator, the bleed streams will contain little or no liquid, the restriction valve 132 in the air escape outlet will accordingly open wide, and the large amount of air will be rapidly vented. This will of course cause a large pressure drop through the air discharge passages and decrease the rate of liquid delivery through the nozzle, and will reduce the rate of movement of liquid downward to the meter. Such slower downward movement of the liquid will correspondingly enhance the static air-separation action. The large volumes of air in the gasoline-air mixture discharged into the centrifugal cup 92 will reduce the mass of the mixture, and decrease the centrifugal separation action, but this will be compensated by the increased separation tendency of the large bubbles of air and by the increased static separation action, both in the second stage chamber and in the centrifuge as well.

At intermediate flow rates, and under the infinitely variable conditions of delivery rates and relative quantities of air, various combinations of first-stage separation and second-stage separation will occur.

Our experience and our observation of the action in our new air-separator indicates that it not only utilizes both centrifugal-separation and static-separation forces, but in addition provides further separation effects which cooperate therewith and which contribute quite substantially to the effective results produced. We believe that such further effects may be explained, at least in part, as follows:

In the centrifuge there is not only a collecting of air in the core stream, but in addition a tendency to cause release of dissolved air and coalescence of small air bubbles into larger air bubbles, so that any air which remains in the main stream tends to be in a more easily separated form.

As the stem moves upward in the inwardly-widening passage adjacent the conical wall of the collector 94, a centrifuge action continues, tending to move air bubbles inward and upward along that conical wall. The stream then passes the upper end of the wall 92 and is released to the large-volume, second stage chamber, at the center of its annular section. Centrifugal force tends to change its direction from a generally upward to an outward tangential direction, and as it moves outward, its swirl is arrested by the vertical baffles 100, and it is deflected outward toward and against the hemispherical wall of the dome 62. As the liquid thus moves outward, its area is progressively increased and its velocity diminished. It now moves downward in a reverse direction from its generally upward movement in and from the centrifuge.

As the high-velocity swirling stream from the centrifuge is thus changed to a relatively quiet body of liquid moving relatively slowly downward in the casing 60 with little or no turbulence, a considerable number and variety of effects are applied. For example, there is the effect of releasing the swirling stream to the larger volume annular chamber, and especially of doing so from the center thereof. There is the effect of reversing the general direction of flow from upward to downward, and of doing so under the influence of horizontally-acting centrifugal force. There is the effect of arresting the swirl, and of doing so by impinging the stream against generally upright and radial baffles, and deflecting it toward and against the surrounding wall of the dome 62. There is the effect of changes in area of the moving liquid. There is the effect of the hemispherical shape of the dome and its relationship to the outlet from the centrifuge. There is the effect of the velocity and pressure changes which occur, and of the pressure gradients which are created, in which the pressures decrease continuously upward along the wall of the dome 62 and along the upright baffles, and decrease inward toward the top center of such dome. There is the effect of bleeding an air discharge stream from the top center of the dome, and of the injector action of the core stream in the pipe 96. Many forces and effects all cooperate together and with the continuing centrifuge action and with static-separation effects in the second-stage separation so that there is a strong and effective tendency for air to separate toward the top center of the dome of the second-stage air-separation chamber.

The core stream containing air separated in the first stage passes upwardly through the pipe 96, and at the top of the dome 62 induces flow through the openings 102 and is joined by air separated in the second stage. The combined separation stream is carried through the pipe 21 and delivered to the air eliminator 22 through the valve 130—132. When the separation stream contains a high proportion of air or vapor and the proportion of liquid in the separation stream is low, the small amount of liquid delivered to the air eliminator permits the float 120 to lower, thus opening the valve 132 wide for rapid air removal and closing the drain valve 136. When little air or vapor is contained in the separation stream, the proportionately larger quantity of liquid raises the float 120 to move the valve 132 toward closed position and the drain valve 136 toward open position, to a balanced inlet and drain valve condition which minimizes flow of liquid through the air eliminator and thus minimizes any loss of efficiency from such by-pass flow.

In the air separation and meter chamber, the gasoline from which the air is eliminated moves downward to the meter at the bottom of that chamber. The liquid is under pressure, and when flow is permitted by the opening of the nozzle valve 40, the flow drives the meter to operate the computer in the usual way.

As set forth above, we prefer to combine the second stage air separation chamber with the meter chamber, for we find that this enhances substantially the air separation function. We believe this enhancement is due in part to the resulting enlargement of the common chamber, but the gentle stirring of the liquid in the common chamber by the movements of the nutating plate 68, seems also to have a beneficial effect. The presence of the meter in the chamber is not essential to effective air separation, however, and Fig. 5 shows an air separator similar to that of Figs. 1 to 4 but without the meter mechanism. In that modified structure, the air separation structure is identical with that in Figs. 1 to 4. The casing 160 is shorter than the casing 60 of Fig. 2, and its bottom is closed by a simple plate 161, provided with a central outlet fitting 162. Air-separation operation of this modified structure is the same as set forth above save for the contributing effect of the meter mechanism.

Under every experimental condition of air admission which we have produced, including conditions of air admission beyond the capacity of prior commercial structures, our structure effectively eliminates the air.

We claim as our invention:

1. Apparatus for separating gas from liquid, comprising an upwardly-discharging cylindrical centrifuge chamber, a swirl-producing inlet thereto, an upwardly converging core-stream collector above said inlet, said collector being spaced from the cylindrical wall of said centrifuge to provide an inwardly widening annular passage to discharge liquid upward from said centrifuge in an annular swirling stream, means forming a second-stage separation chamber about the upper end of said discharge passage and into which liquid from said stream may move outward under centrifugal force, a gas outlet to discharge a gas-separation stream from the top of said second stage chamber adjacent the center of said inwardly-widening annular passage, and a liquid outlet from the second-stage chamber below the discharge end of said annular passage.

2. Apparatus for separating gas from liquid, comprising an upwardly-discharging cylindrical centrifuge chamber, a swirl-producing inlet thereto, an upwardly converging core-stream collector above said inlet, said collector being spaced from the cylindrical wall of said centrifuge to provide an inwardly widening annular passage to discharge liquid upward from said centrifuge in an annular swirling stream, means forming a second-stage separation chamber about the upper end of said discharge passage and into which liquid from said stream may move outward under centrifugal force, generally-upright, outwardly diverging walls in said second-stage separation chamber to arrest tangential movement of such outwardly moving liquid, and a gas outlet upwardly of said walls and above said stream discharge point, and a liquid outlet downwardly of said walls and below said stream discharge point.

3. Apparatus for separating gas from liquid, comprising an upwardly-discharging cylindrical centrifuge chamber, a swirl-producing inlet thereto, an upwardly converging core-stream collector above said inlet, said collector being spaced from the cylindrical wall of said centrifuge to provide an inwardly widening annular passage to discharge liquid upward from said centrifuge in an annular swirling stream, means forming a second-stage separation chamber about the upper end of said discharge passage and into which liquid from said stream may move outward under centrifugal force, generally-upright, outwardly diverging walls in said second-stage separation chamber to arrest tangential movement of such outwardly moving liquid, the outer walls of said chamber converging upwardly at the level of said stream discharge, a gas outlet upwardly of said walls and above said level, and a liquid outlet downwardly of said walls and below said level.

4. Apparatus for separating gas from a main stream of liquid, comprising a central centrifuge chamber, a swirl-producing inlet thereto, a peripheral outlet therefrom above said inlet to discharge a swirling main stream therefrom, a second-stage separation chamber surrounding said centrifuge chamber, baffles to arrest the swirl of said main stream in said second-stage chamber, means communicating independently with each chamber to lead off gas-separation streams continuously therefrom, and a liquid outlet for said second-stage separation chamber downwardly of said baffles.

5. Apparatus for separating gas from a main stream of liquid, comprising a central centrifuge chamber, a concentric second-stage separation chamber surrounding said centrifuge chamber, a swirl-producing inlet below the top of said centrifuge chamber, an annular opening at the upper periphery of said centrifuge chamber in open communication with said surrounding second-stage separation chamber at a point intermediate its height, a core stream discharge conduit opening from said centrifuge at a point spaced inwardly from said annular opening and leading to a discharge point outside said second-stage separation chamber, and an upper gas outlet and a lower liquid outlet from said second-stage chamber.

6. Apparatus for separating gas from a main stream of liquid, comprising a central centrifuge chamber and a surrounding second-stage separation chamber, said centrifuge being defined at the top by an upright cylindrical wall, an upwardly converging core stream collector disposed within said cylindrical wall and spaced therefrom to define therewith an annular, inwardly widening outlet passageway from said centrifuge chamber, a gas-separation conduit connected to the top of said collector and leading to a discharge point outside said second-stage separation chamber, and means to lead off a gas-separation stream from said second-stage chamber at a point above and adjacent the axis of said inwardly widening passageway.

7. In liquid handling apparatus, a gas separator, comprising a centrifuge chamber having a swirl-producing inlet and a peripheral outlet, a core-stream collector therein, means to supply fluid under pressure to said chamber, a core-stream discharge conduit leading from said collector, a second-stage separation chamber down stream from said centrifuge chamber, and injector means actuated by flow through said discharge conduit to promote gas-separation flow from said second-stage separation chamber.

8. In a liquid-handling apparatus, a gas separator, comprising a first stage centrifuge chamber and an interconnected second-stage static-separation chamber, means to supply liquid to said first-stage chamber, a main stream outlet from the second-stage chamber, means to withdraw gas-separation flow from said chambers, valve-means to restrict said gas-separation flow, a float chamber connected to receive gas-separation flow from said valve-means, a gas vent from said float chamber, a drain valve for said float chamber, and a float in said float chamber connected to move said restriction valve means toward open position and said drain valve toward closed position upon lowering of said float.

9. In liquid handling apparatus as defined in claim 8 in which lowering of said float causes proportionally greater valve-means opening than drain-valve closing.

10. In liquid handling apparatus, a gas separator having an inlet and a main-stream outlet, means to lead off continuously from said separator a gas-separation stream, valve means normally to restrict the volume of said gas-separation stream, a float chamber to receive said stream and having a gas vent and a drain valve, and float means connected to said valve means and said drain valve for opposite actuation thereof, said connections being arranged to cause proportionally greater opening of said valve-means than closing of said drain valve.

11. Apparatus for separating gas from a liquid dispensing line, comprising a centrifuge chamber having an inlet adapted to be connected to said line, flow-directing means to cause a swirling movement of liquid entering said chamber whereby at high flow-rates gas tends to collect at the core of the swirling liquid in said chamber, a gas-discharge conduit opening from the center of said chamber and leading to a discharge point outside the line, said conduit being open to continuously discharge a gas-separation stream from the core position in said chamber, a main-stream outlet from said chamber, a second-stage gas-separator connected to said main-stream outlet and adapted at low flow-rates to effect static gas separation from the liquid flowing therethrough, means to continuously discharge from the top of said second-stage separator a second-stage gas-separation stream, and a main-stream outlet adacent the bottom of said second-stage separator.

12. Apparatus as defined in claim 11, with the addition of variable restriction means normally restricting the continuous gas-separation streams to relatively small flow rates, and means responsive to the proportion of gas to liquid in said streams to increase the flow rates when a high proportion of gas is present therein.

13. Apparatus as defined in claim 11, with the addition of a vented gas eliminator connected to receive the continuous gas-separation streams, means normally restricting the flow in such streams to a normal small flow rate, and means responsive to the quantity of liquid delivered to the gas eliminator to decrease the restriction of said restricting means and increase such flow rate when the amount of liquid so delivered decreases below that delivered by said normal flow rate.

14. Apparatus for separating gas from a liquid dispensing line, comprising a centrifuge having an inlet adapted to be connected to said line and having an upward peripheral outlet to discharge swirling liquid therefrom, means to continuously discharge a centrifuge core stream to a point outside the line, means forming a large-volume second-stage gas-separation chamber about and below said peripheral outlet and into which such swirling liquid may move outward under centrifugal force, generally upright, outwardly diverging walls to arrest tangential movement of such outwardly moving liquid, means to continuously discharge a gas-separation stream from said second-stage chamber at a point disposed upwardly of said walls, and a main liquid-outlet from said chamber downwardly of said walls.

15. Apparatus for separating gas from a liquid dispensing line, comprising a cylindrical centrifuge, a swirl-producing inlet adjacent the bottom of said centrifuge, a central core-stream collector in said centrifuge above said inlet, a peripheral mainstream outlet from said centrifuge above said inlet, means forming a second-stage separation chamber about said centrifuge, and in open communication with said outlet, means to arrest tangential movement of liquid discharged from said centrifuge outlet and direct such liquid radially outward in said second-stage separation chamber, a main liquid-outlet from said chamber below said centrifuge outlet thereto, a gas-discharge conduit leading from said core-stream collector to a point outside said second-stage chamber, and a gas-discharge outlet from said second-stage chamber at a point above and centrally within the upwardly projected area of said centrifuge outlet to said chamber, said gas-discharge conduit and outlet being continuously open to continuously pass gas-discharge flow directly from both the centrifuge and second-stage chamber.

16. Apparatus for separating gas from a liquid dispensing line, comprising a first-stage centrifugal gas separator having an inlet for connection to the line, a second-stage gas separator connected to the first-stage separator and having a main outlet, means communicating independently with the two separators to pass gas-separation flow continuously therefrom, a vented gas eliminator to which such flow is discharged, means normally restricting gas-separation flow to said eliminator, said eliminator including float means operative to increase gas-separation flow in response to decreased proportions of liquid in such flow, and means to discharge liquid from the eliminator.

17. Apparatus for separating gas from a main stream of liquid, comprising a first, centrifuge chamber having a swirl producing inlet, said inlet and chamber serving to segregate the gas in a particular portion of said chamber, a second stage gas separation chamber disposed exteriorly of said first chamber and having a portion disposed to receive gas segregated in said second stage chamber, gas venting means having first inlet means disposed in the gas segregating portion of said first chamber and having second inlet means disposed in the gas receiving portion of said second stage chamber, and means defining a liquid outlet for the second stage chamber.

18. Apparatus for separating gas from a main stream of liquid, comprising a central centrifuge chamber and a surrounding second-stage separation chamber, a swirl producing inlet to said centrifuge chamber adapted to produce a core stream of gas therein, said second-stage separation chamber being defined at the top by a generally hemispherical dome for collecting gas separated in said chamber, a peripheral, annular outlet from said centrifuge chamber opening upwardly to said second-stage chamber at a level adjacent the bottom of the dome and gas venting means having inlet means disposed in the core stream and having additional inlet means disposed at the top of said dome in communication with the gas collected therein.

19. Apparatus for separating gas from a main stream of liquid, comprising a centrifuge chamber having a swirl producing inlet adapted to produce a core stream of gas therein and having a peripheral outlet, a second-stage separation chamber disposed in communication with said peripheral outlet and having a gas collecting portion, venting means having inlet means disposed in said core stream and having additional inlet means disposed in said gas collecting portion of the second stage chamber, valve means for controlling the discharge from said venting means, and means including a float chamber connected to receive the effluent from said venting means and a float connected to operate said valve means to close the valve as the liquid level in the float chamber rises and to open it as the liquid level falls.

20. Apparatus for separating gas from a main stream of liquid comprising a centrifuge chamber having a swirl producing inlet adapted to produce a core stream of gas in the chamber and having a peripheral outlet, a second stage separation chamber disposed in communication with said peripheral outlet, a core stream collector having an inlet disposed in said core stream and having a discharge conduit, said conduit including inlet means communicating with the top of said second-stage chamber, a valve for said conduit, a chamber connected to receive the effluent from said conduit and means responsive to an increasing level of liquid in said chamber for moving said valve in a closing direction and responsive to a decreasing level of liquid in said chamber for moving said valve in an opening direction.

21. A gas and liquid separation system comprising a liquid pump having suction and discharge conduits, a gas separator connected to the discharge conduit, said separator including a gas collecting section, a gas eliminating chamber, an effluent conduit connecting the gas collecting section and the eliminating chamber, a drain conduit connecting the bottom of the eliminating chamber with the suction conduit, a first valve in the effluent conduit, a second valve in the drain conduit and liquid-level responsive means in the eliminating chamber for moving said first and second valves toward closed and open positions respectively as the liquid level rises in said eliminating chamber.

22. A gas and liquid separation system comprising a liquid pump having suction and discharge conduits, a gas separator connected to the discharge conduit, said separator including a gas collecting section, a gas eliminating chamber, an effluent conduit connecting the gas collecting section and the eliminating chamber, an atmospheric vent connected to the top of the eliminating chamber, a drain conduit connecting the bottom of the eliminating chamber with the suction conduit, a first valve in the effluent conduit, a second valve in the drain conduit and liquid-level responsive means in the eliminating chamber for moving said first and second valves toward closed and open positions respectively as the liquid level rises in said eliminating chamber and toward open and closed positions respectively as the liquid level falls.

23. A gas and liquid separation system comprising a liquid pump having suction and discharge conduits, a gas separator connected to the discharge conduit, said separator including a gas collecting section, a gas eliminating chamber, an effluent conduit connecting the gas collecting section and the eliminating chamber, an atmospheric vent connected to the top of the eliminating chamber, a drain conduit connecting the bottom of the eliminating chamber with the suction conduit, a first valve in the effluent conduit, a second valve in the drain conduit and liquid-level responsive means in the eliminating chamber for moving said first and second valves toward open and closed positions respectively as the liquid level falls in said elimination chamber.

References Cited in the file of this patent

UNITED STATES PATENTS

| | | |
|---|---|---|
| 457,917 | Shaw | Aug. 18, 1891 |
| 1,215,935 | Hickman | Feb. 13, 1917 |
| 1,734,507 | Westling et al. | Nov. 5, 1929 |
| 2,049,405 | Brake | July 28, 1936 |
| 2,075,344 | Hawley | Mar. 30, 1937 |
| 2,124,681 | Jauch et al. | July 26, 1938 |
| 2,187,646 | Darrieus | Jan. 16, 1940 |
| 2,228,401 | Pressler | Jan. 14, 1941 |
| 2,258,495 | Jauch et al. | Oct. 7, 1941 |
| 2,277,651 | Steele | Mar. 24, 1942 |
| 2,507,273 | Schultz | May 9, 1950 |